United States Patent
Lu et al.

(10) Patent No.: US 12,393,076 B2
(45) Date of Patent: Aug. 19, 2025

(54) ELECTRONIC DEVICE

(71) Applicant: InnoLux Corporation, Miao-Li County (TW)

(72) Inventors: Tsung-Che Lu, Miao-Li County (TW); Chieh-Hsiang Hsu, Miao-Li County (TW); Chang-Heng Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/647,025

(22) Filed: Apr. 26, 2024

(65) Prior Publication Data

US 2024/0272472 A1 Aug. 15, 2024

Related U.S. Application Data

(63) Continuation of application No. 18/299,861, filed on Apr. 13, 2023, now Pat. No. 12,001,093.

(30) Foreign Application Priority Data

May 19, 2022 (CN) .................. CN202210555630.X

(51) Int. Cl.
*G02F 1/1335* (2006.01)
*G02F 1/1368* (2006.01)

(52) U.S. Cl.
CPC ...... *G02F 1/133528* (2013.01); *G02F 1/1368* (2013.01); *G02F 2202/22* (2013.01); *G02F 2202/28* (2013.01)

(58) Field of Classification Search
CPC ............. G02F 1/133528; G02F 1/1368; G02F 2202/22; G02F 2202/28
USPC .......................................................... 349/40
See application file for complete search history.

(56) References Cited

U.S. PATENT DOCUMENTS

2019/0310507 A1* 10/2019 Yamada ............ G02F 1/133528
2021/0231999 A1* 7/2021 Imazeki .................... G09F 9/00

* cited by examiner

*Primary Examiner* — Michael H Caley
*Assistant Examiner* — Illiam D Peterson
(74) *Attorney, Agent, or Firm* — McClure, Qualey & Rodack, LLP

(57) ABSTRACT

An electronic device is provided. The electronic device includes a first substrate, a polarizer, a conductive pad, and a conductive adhesive. The polarizer is disposed on the first substrate and has an edge. The conductive pad is disposed on the first substrate. The conductive adhesive is disposed on the first substrate. From a top view, the conductive adhesive has a first portion not overlapped with the conductive pad and a second portion overlapped with the conductive pad, and the first portion is disposed between the edge of the polarizer and the second portion. The area of the conductive pad is greater than the area of the second portion.

9 Claims, 4 Drawing Sheets

ELECTRONIC DEVICE

CROSS REFERENCE TO RELATED APPLICATIONS

This Application is a continuation application of U.S. application Ser. No. 18/299,861, filed on Apr. 13, 2023 (now U.S. Pat. No. 12,001,093), which claims priority of China Patent Application No. 202210555630.X, filed on May 19, 2022, the entirety of which is incorporated by reference herein.

BACKGROUND OF THE INVENTION

Field of the Invention

The present disclosure relates to an electronic device, and, in particular, to an electronic device provided with a conductive adhesive.

Description of the Related Art

With the vigorous development of panel display technology and the reduction of manufacturing costs, panel display devices with advantages such as low radiation, small thickness, and low power consumption are more and more favored by consumers. Therefore, the panel display devices are widely used in electronic devices, such as mobile phones, game consoles, PDAs, etc. In general, panel display devices mainly include plasma display panels (PDPs), liquid crystal displays (LCDs), and organic light-emitting diode (OLED) displays, etc., wherein the liquid crystal display devices have gradually become the mainstream panel display devices in the market due to its relatively low cost.

During the evolution of electronic devices, in order to meet the demands of high resolution and achieve higher production capacity, the size of display devices has continued to scale down, causing many unresolved problems in the manufacturing process of electronic devices. While existing electronic devices generally meet the needs of the user, they are not entirely satisfactory in every respect. Therefore, it is still necessary to improve the structure of electronic devices in order to manufacture a display device that meets product requirements and has an enhanced visual effect.

BRIEF SUMMARY OF THE INVENTION

An electronic device is provided according to some embodiments of the present disclosure. The electronic device includes a first substrate, a polarizer, a conductive pad, and a conductive adhesive. The polarizer is disposed on the first substrate and has an edge. The conductive pad is disposed on the first substrate. The conductive adhesive is disposed on the first substrate. From a top view, the conductive adhesive has a first portion not overlapped with the conductive pad and a second portion overlapped with the conductive pad, and the first portion is disposed between the edge of the polarizer and the second portion. The area of the conductive pad is greater than the area of the second portion.

In order to make the features or advantages of the present disclosure more comprehensible, some embodiments are illustrated hereinafter, and detailed descriptions are provided with reference to the drawings.

DETAILED DESCRIPTION OF THE INVENTION

Figure 1A:
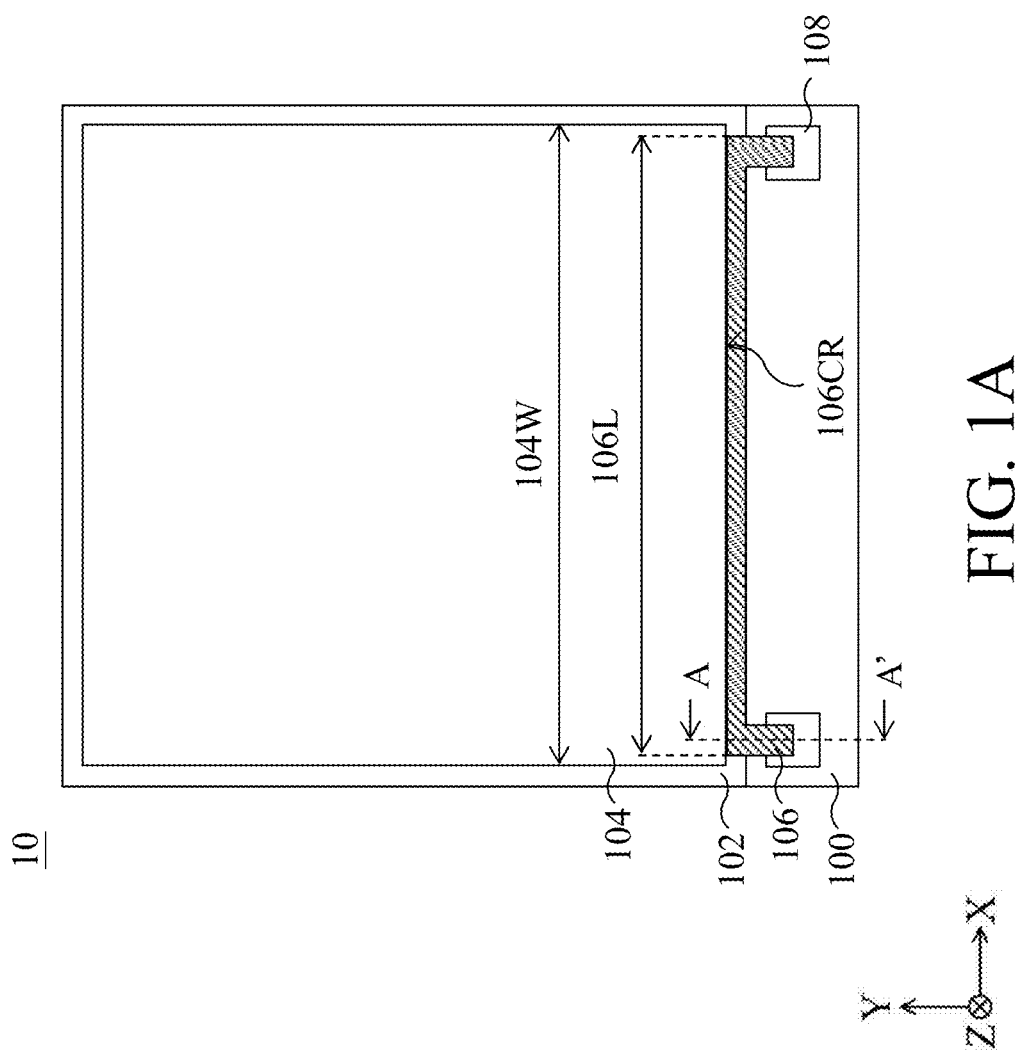
FIG. 1A is a top view of an electronic device according to some embodiments of the present disclosure.

Hereinafter is a detailed description of the electronic device of the embodiments of the present disclosure. It should be understood that the following description provides many different embodiments for implementing various aspects of some embodiments of the present disclosure. The specific elements and arrangements described below are merely to clearly describe some embodiments of the present disclosure. Of course, these are only used as examples rather than limitations of the present disclosure. Furthermore, similar and/or corresponding reference numerals may be used in different embodiments to designate similar and/or corresponding elements, in order to clearly describe the present disclosure. However, the use of these similar and/or corresponding reference numerals is only for the purpose of simply and clearly description of some embodiments of the present disclosure, and does not imply any correlation between the different embodiments and/or structures discussed.

It should be understood that the drawings of the present disclosure are not drawn to scale, and in fact, the dimensions of elements may be arbitrarily enlarged or reduced in order to clearly represent the features of the present disclosure.

In addition, when referring to "a layer is on or over another layer", it may refer to the case where the layer is in direct contact with another layer. Alternatively, it may also be the case that the layer is not in direct contact with another layer. In this case, one or more intermediate layers are disposed between the layer and another layer.

It should be understood that ordinal numbers such as "first", "second", and the like used in the specification and claims are used to modify elements and are not intended to imply and represent the element(s) have any previous ordinal numbers, and do not represent the order of a certain element and another element, or the order of the manufacturing method. The use of these ordinal numbers is only used to clearly distinguish an element with a certain name and another element with the same name. The claims and the specification may not use the same terms, for example, a first element in the specification may be a second element in the claims.

The term "about" used herein generally means within 10%, within 5%, within 3%, within 2%, within 1%, or within 0.5% of a given value or a given range. The value given herein is an approximate value, that is, the meaning of "about" may still be implied without the specific description of "about". Furthermore, the phrase "a range is greater than or equal to a first value, and the range is less than or equal to a second value" means that the range includes the first value, the second value, and other values in between.

Unless otherwise defined, all terms including technical and scientific terms used herein have the same meaning as commonly understood by a person of ordinary skills in the art. It should be understood that these terms, such as those defined in commonly used dictionaries, should be interpreted as having meanings consistent with the relevant art and the background or context of the present disclosure, and should not be interpreted in an idealized or overly formal manner, unless otherwise defined in the embodiments of the present disclosure.

According to some embodiments of the present disclosure, an optical microscope (OM), a scanning electron microscope (SEM), a film thickness profilometer (α-step), an ellipsometer, or other suitable methods may be used to measure the spacing or distance between elements, or the width, thickness, height, or area of each element. In detail, according to some embodiments, a scanning electron microscope may be used to obtain a cross-sectional structure image including the element to be measured, and measure the pitch or distance between each element, or the width, thickness, height, or area of each element.

It should be understood that in the following embodiments without departing from the spirit of the present disclosure, features in several different embodiments may be replaced, combined, and recombined to become other embodiments. As long as the features of the embodiments do not violate the spirit or conflict with each other, they may be arbitrarily recombined and used.

According to some embodiments of the present disclosure, an electronic device is provided. The electronic device includes a polarizer and conductive adhesive disposed on a first substrate. The conductive adhesive is adjacent to an edge of the polarizer, and an angle between the extending direction and an absorption-axis direction of the polarizer is between 80° and 100°. In this way, the possibility of the conductive adhesive being penetrated into the polarizer in a humid and warm environment may be reduced, thereby affecting the visual effect of the peripheral area of the electronic device.

It should be understood that, in addition to display devices, the embodiments of the present disclosure may be applied to various electronic devices, such as light emitting devices, touch devices, sensing devices, antenna devices, splicing devices, or combinations thereof, but the present disclosure is not limited thereto. The electronic device may be a bendable or flexible electronic device. The electronic device may include, for example, light-emitting diodes, liquid crystals, fluorescence, phosphors, other suitable display media, or combinations thereof, but the present disclosure is not limited thereto. The light emitting diode may include, for example, organic light-emitting diodes (OLEDs), inorganic light-emitting diodes (LEDs), mini-light-emitting diodes (mini-LEDs), micro-light-emitting diodes (micro-LEDs), quantum dots (QDs) light-emitting diodes (such as QLEDs, QDLEDs), other suitable materials, or any permutation and combination thereof, but the present disclosure is not limited thereto. The display device may include, for example, a spliced display device, but the present disclosure is not limited thereto. The concepts or principles of the present disclosure may also be applied to non-self-illuminating liquid crystal displays (LCDs), but the present disclosure is not limited thereto.

The antenna device may be, for example, a liquid crystal type antenna device or a non-liquid crystal type antenna device, but the present disclosure is not limited thereto. The antenna device may include, for example, a splicing antenna device, but the present disclosure is not limited thereto. The sensing device may be a sensing device for sensing capacitance, light, heat, or ultrasonic, but the present disclosure is not limited thereto. It should be noted that the electronic device may be any permutation and combination thereof, but the present disclosure is not limited thereto. In addition, the shape of the electronic device may be rectangular, circular, polygonal, with curved edges, or other suitable shapes. The electronic device may have peripheral systems such as a driving system, a control system, and a light source system to support a display device, an antenna device, or a splicing device. The electronic device of the present disclosure may be, for example, a display device, but the present disclosure is not limited thereto.

Figure 1B:
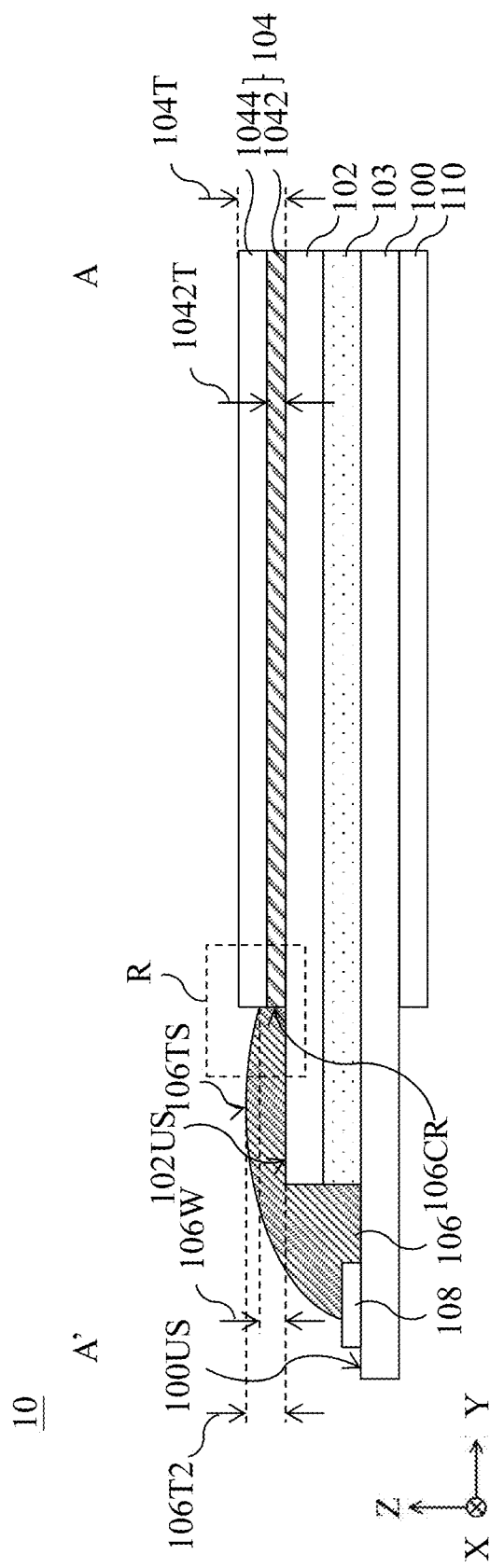
FIG. 1B is a cross-sectional view of an electronic device according to some embodiments of the present disclosure.

FIGS. 1A and 1B are respectively a top view and a cross-sectional view of an electronic device 10 according to some embodiments of the present disclosure. It should be noted that the cross-sectional view of FIG. 1B is taken along the section line AA' in FIG. 1A. Referring to FIGS. 1A and 1B, the electronic device 10 includes a first substrate 100, a polarizer 104, and a conductive adhesive 106. The polarizer 104 and the conductive adhesive 106 are disposed on the first substrate 100. As shown in FIG. 1B, the polarizer 104 has a conductive layer 1042, and the conductive adhesive 106 is electrically connected to the conductive layer 1042 of the polarizer 104. In some embodiments, the conductive layer 1042 of the polarizer 104 may be used as an antistatic layer, which may reduce the impact of excessive static charges accumulated on the surface of the electronic device 10 on the touch effect of the electronic device 10. The conductive adhesive 106 electrically connected to the conductive layer 1042 may provide a static conduction path for the electronic device 10, so as to transfer the static electricity accumulated on the surface of the electronic device 10 to other conductive structures on the first substrate 100, thereby improving the display quality and touch effect of the electronic device 10.

In some embodiments, although not explicitly shown in FIGS. 1A and 1B and subsequent drawings, the first substrate 100 may include, for example, a base substrate, a thin film transistor layer (TFT layer) disposed on the base substrate and used as a driving circuit, an electrode layer disposed on the base substrate and electrically connected to the thin film transistor layer, and/or an alignment layer disposed on the thin film transistor layer and the electrode layer. The alignment layer may be used to align the liquid crystal molecules in the liquid crystal layer to have a desired orientation.

In some embodiments, the conductive layer 1042 of the polarizer 104 may include, for example, pressure sensitive adhesive (PSA), but the present disclosure is not limited thereto. In some embodiments, the material of the conductive layer 1042 may contain carboxyl groups, hydroxyl groups, esters, or combinations thereof, but the present disclosure is not limited thereto. According to some embodiments, a surface resistance of the conductive layer 1042 may be between about $10^8 \Omega/\square$ (i.e. $\Omega$/square, $\Omega$/sq, or $\Omega/m^2$) and about $10^{10} \Omega/\square$, such as about $2.5 \times 10^8 \Omega/\square$, about $5 \times 10^8 \Omega/\square$, $7.5 \times 10^8 \Omega/\square$, or about $1.5 \times 10^9 \Omega/\square$. In some embodiments, the thickness 1042T of the conductive layer 1042 in a normal direction of the first substrate 100 (e.g., the Z-axis in FIG. 1B) may be between 1 μm and 30 μm, for example, about 10 μm. The conductive layer 1042 whose resistance and thickness are within the above range may maintain good touch sensitivity and achieve desired antistatic effect. In some embodiments, the material of the conductive adhesive 106 may include copper, silver, or alloys thereof, but the present disclosure is not limited thereto.

As shown in FIG. 1A, the conductive adhesive 106 is adjacent to an edge of the polarizer 104 and extends laterally along a horizontal direction (e.g., the X-axis in FIG. 1A). Furthermore, an angle between the extending direction of the conductive adhesive 106 and an absorption-axis direction of the polarizer 104 is between 80 degrees and 100 degrees, such as about 90 degrees. During the fabrication of the polarizer 104, sub-layers in the polarizer 104 are stretched to have the absorption-axis extending along a specific direction. However, when the sub-layers of the polarizer 104 are stretched, the sub-layers shrink along a direction perpendicular to the stretching direction, resulting in misalignment between the sub-layers of the polarizer 104. If the conductive adhesive 106 is formed along the edge occurring shrinks of the sub-layers of the polarizer 104, the conductive adhesive 106 may be penetrated into the polarizer 104 in a humid and warm environment. Therefore, when the conductive adhesive 106 is designed to have the angle between the extension direction and the absorption-axis direction of the polarizer 104 within the above range, the probability of the conductive adhesive 106 being penetrated into the polarizer 104 may be reduced, thereby maintaining the visual effect of the periphery area of the electronic device 10. Furthermore, the above design is also conducive to the development of the electronic device 10 toward extremely narrow borders.

According to some embodiments, an absorption-axis direction of a polarizer to be tested may be determined by using a polarizer with a known absorption-axis direction. In detail, firstly, the polarizer with the known absorption-axis direction is overlapped with the polarizer to be tested. Next, the polarizer is rotated with the known absorption-axis direction until light cannot pass through the two polarizers. When the light cannot pass through the two overlapping polarizers, the absorption-axis directions of the two polarizers are perpendicular to each other, so the absorption-axis direction of the polarizer to be tested may be obtained. In other embodiments, the absorption-axis direction may be measured by a spectrometer (such as a spectrometer of the type JASCO V-7100). This apparatus may inject an incident light into a linear polarizer to form a linear polarized light. This linear polarized light enters the sample to be tested, and the optical properties (absorption-axis angle, polarization degree, transmittance, etc.) of the sample to be tested may be obtained by rotating with different angles, but the present disclosure is not limited thereto.

According to some embodiments, as shown in FIG. 1B, the polarizer 104 may further include a polarizing film 1044. In some embodiments, the conductive adhesive 106 may be in contact with the edge of the polarizer 104. In an embodiment, the conductive adhesive 106 is at least in contact with the conductive layer 1042 of the polarizer 104. In an embodiment, the conductive adhesive 106 may be in contact with both the conductive layer 1042 and the polarizing film 1044 of the polarizer 104. Although not explicitly shown in FIG. 1B and subsequent drawings, it should be understood that according to different embodiments, the polarizing film 1044 of the polarizer 104 may be a single-layer structure or a multi-layer structure including multi-sub-polarizing films. The sub-polarizing film in the multi-layer structure may be a functional film layer that provides at least one of the functions such as anti-reflection, anti-glare, anti-fouling, and enhancement of light transmittance.

According to some embodiments, as shown in FIGS. 1A and 1B, the interface where the conductive adhesive 106 is in contact with the polarizer 104 is the contact region 106CR, and a portion of the contact region 106CR is the region where the conductive adhesive 106 is in contact with the conductive layer 1042. In some embodiments, in the top view shown in FIG. 1A, the length 106L of the region where the conductive adhesive 106 is in contact with the conductive layer 1042 along the extending direction of the conductive adhesive 106 (e.g., the X-axis in FIG. 1A) may be greater than about 10% of the width 104W of the polarizer 104 along the extension direction of the conductive adhesive 106 (e.g., the X-axis in FIG. 1A), such as greater than about 20%, about 30%, about 40%, about 50%, about 60%, about 70%, about 80%, or about 90%. If the length 106L is too short, such as less than about 10% of the width 104W, the conductive adhesive 106 may not effectively conduct the static electricity accumulated on the surface of the electronic device 10. Furthermore, in some embodiments, the length 106L of the region where the conductive adhesive 106 is in contact with the conductive layer 1042 along the extending direction of the conductive adhesive 106 (e.g., the X-axis in FIG. 1A) may be equal to the width 104W of the polarizer 104 along the extension direction of conductive adhesive 106 (e.g., the X-axis in FIG. 1A).

According to some embodiments, as shown in FIG. 1B, the contact region 106CR may have a width 106W along the normal direction of the first substrate 100 (e.g., the Z-axis in FIG. 1B). That is, the width 106W is the height of the contact interface between the conductive adhesive 106 and the polarizer 104. In some embodiments, the width 106W may be greater than or equal to the thickness 1042T of the conductive layer 1042 of the polarizer 104 in the normal direction of the first substrate 100 (e.g., the Z-axis in FIG. 1B). In some embodiments, the width 106W may be between about 1 µm and about 250 µm.

In some embodiments, the electronic device 10 may further include a second substrate 102. The second substrate 102 is disposed between the first substrate 100 and the polarizer 104. As shown in FIG. 1B, the conductive adhesive 106 may be further disposed on the second substrate 102. According to some embodiments, the second substrate 102 may include a base substrate, and the base substrate may include a color filter and a light shielding layer. In an embodiment, the second substrate 102 may further include an alignment layer. In an embodiment in which the second substrate 102 includes an alignment layer, the alignment layer may be disposed on a side of the base substrate not disposed with the polarizer 104. In some other embodiments, the second substrate may not include the color filter and the light-shielding layer, but the present disclosure is not limited thereto. The base substrates of the first substrate 100 and the second substrate 102 of the present disclosure may be, for example, flexible or inflexible substrates, and the materials may include plastic, glass, quartz, sapphire, ceramics, carbon fiber, other suitable substrate materials, or combinations thereof, but the present disclosure is not limited thereto. In some embodiments, the above plastic materials may include polyimide (PI), polyethylene terephthalate (PET), polycarbonate (PC), and other suitable materials, or combinations thereof, but the present disclosure is not limited thereto. In some other embodiments, the second substrate 102 may be replaced by an encapsulation layer. The encapsulation layer may provide protection, encapsulation, and/or planarization functions for the display units, and the encapsulation layer may include organic materials, inorganic materials, combinations thereof, or mixtures thereof, but the present disclosure is not limited thereto.

In some embodiments, the polarizer 104 may be in contact with the second substrate 102. In an embodiment, the polarizer 104 may be in contact with the second substrate 102 directly. More specifically, in an embodiment, the conductive layer 1042 of the polarizer 104 may be in contact with the second substrate 102. According to some embodiments, as shown in FIG. 1B, the conductive adhesive 106 may have a thickness 106T2 from an upper surface 102US of the second substrate 102 to a topmost surface 106TS of the conductive adhesive 106. In some embodiments, the thickness 106T2 may be smaller than the thickness 104T of the polarizer 104 in the normal direction of the first substrate 100 (e.g., the Z-axis in FIG. 1B). The thickness 106T2 of the conductive adhesive 106 is smaller than the thickness 104T of the polarizer 104. That is, the level of the topmost surface 106TS of the conductive adhesive 106 is lower than the upper surface of the polarizer 104, which may reduce the risk of light leakage and reduce the possibility of damage during the assembly process of the electronic device 10.

In some embodiments, the thickness 106T2 of the conductive adhesive 106 may be between about 1 μm and about 250 μm. In some embodiments, the thickness 104T of the polarizer 104 may be between about 50 μm and about 250 μm.

Still referring to FIGS. 1A and 1B, in some embodiments, the electronic device 10 may further include a conductive pad 108. The conductive pad 108 may be disposed on the first substrate 100. In detail, in an embodiment, the conductive pad 108 may be disposed on a portion of the first substrate 100 that does not overlap with the second substrate 102. In some embodiments, in addition to disposing the conductive pad 108, the portion of the first substrate 100 that does not overlap with the second substrate 102 may be used as a region electrically connected to a flexible printed circuit board, a region electrically connected to a driving integrated circuit chip, or a region bonded with a driving integrated circuit chip, but the present disclosure is not limited thereto.

According to some embodiments, the conductive pad 108 may be electrically connected to the conductive adhesive 106 to further provide a path for the static electricity transmitted through the conductive adhesive 106 to discharge. In some embodiments, as shown in FIG. 1B, the conductive adhesive 106 may be formed on the conductive pad 108 and extend from the conductive pad 108 to the first substrate 100 and the second substrate 102. According to some embodiments, the material of the conductive pad 108 may include aluminum (Al), copper (Cu), molybdenum (Mo), titanium (Ti), platinum (Pt), iridium (Ir), nickel (Ni), chromium (Cr), silver (Ag), gold (Au), tungsten (W), or alloys thereof, but the present disclosure is not limited thereto.

Still referring to FIG. 1B, in some embodiments, the electronic device 10 may further include a liquid crystal layer 103. The liquid crystal layer 103 is sandwiched between the first substrate 100 and the second substrate 102. In some embodiments, as shown in FIGS. 1A and 1B, the projection planes of the liquid crystal layer 103 and the second substrate 102 on the first substrate 100 may overlap each other. Therefore, in the top view of FIG. 1A, the second substrate 102 may cover the liquid crystal layer 103.

Still referring to FIG. 1B, in some embodiments, an additional polarizer 110 may be disposed on the side of the first substrate 100 not disposed with the liquid crystal layer 103. Likewise, the polarizer 110 may have a similar or the same composition to polarizer 104. According to some embodiments, the polarizer 110 may be a single-layer structure or a multi-layer structure including multi-sub-polarizing films. The sub-polarizing film in the multi-layer structure may be a functional film layer that provides at least one of the functions, such as anti-reflection, anti-glare, anti-fouling, and enhancement of light transmittance.

Figure 1C:
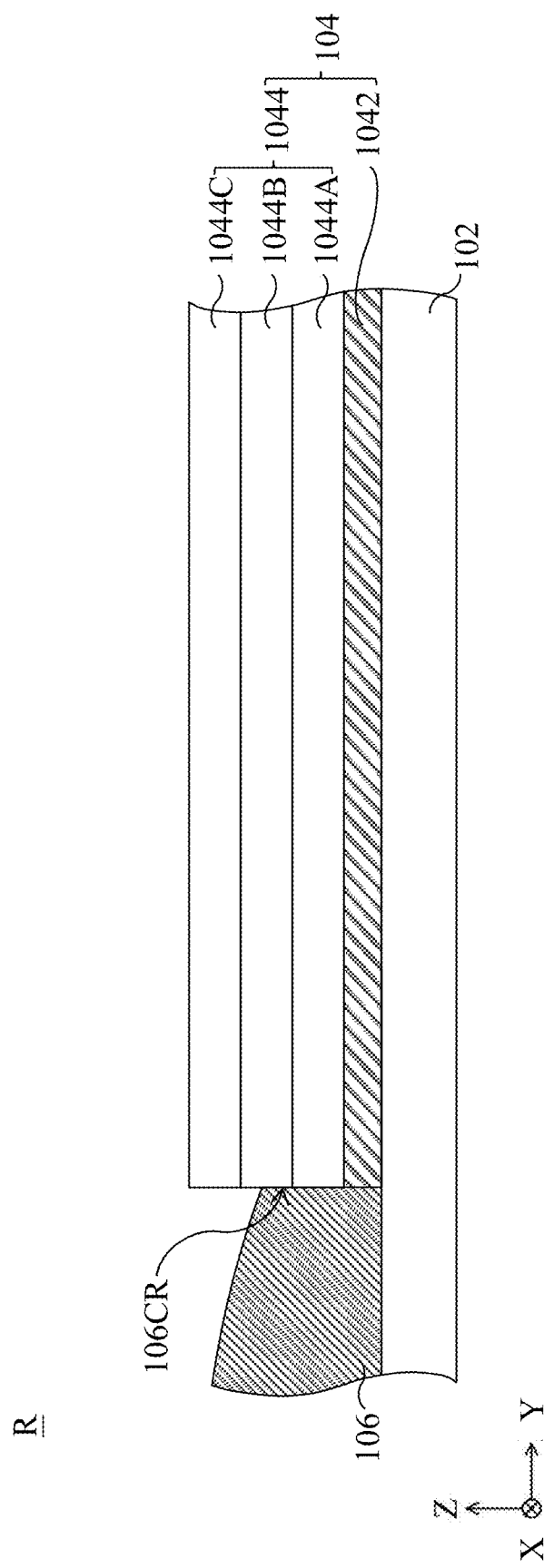
FIG. 1C is a partial enlarged view of the electronic device in FIG. 1B according to some embodiments of the present disclosure.

Next, referring to FIG. 1C, FIG. 1C is a partial enlarged view of the electronic device 10 shown in FIG. 1B according to some embodiments of the present disclosure. It should be noted that FIG. 1C is taken from the region R in FIG. 1B. According to some embodiments, the polarizing film 1044 of the polarizer 104 may include sub-polarizing films 1044A, 1044B and 1044C. Although the polarizing film 1044 is only shown as having three layers of sub-polarizing films (the sub-polarizing films 1044A, 1044B, and 1044C) in FIG. 1C, the present disclosure is not limited thereto. In other embodiments, the polarizing film 1044 may include less layers or more layers of sub-polarizing films.

As described above, when forming the polarizer 104, the sub-layers in the polarizer 104 (e.g., the sub-polarizing films 1044A, 1044B, and 1044C in FIG. C) are stretched to have absorption axes extending along a specific direction. However, when the sub-layers of the polarizer 104 are stretched, the sub-layers are shrunk along a direction perpendicular to the stretching direction, resulting in misalignment between the sub-layers of the polarizer 104. As shown in FIG. 1C, if an angle between the extending direction of the conductive adhesive 106 and the absorption-axis direction of the polarizer 104 is about 80 degrees and about 100 degrees, the sub-polarizing films 1044A, 1044B, and 1044C of the polarizer 104 may not have retracted edges in the extending direction of the conductive adhesive 106 (e.g., the X-axis in FIG. 1C). Therefore, the penetration of the conductive adhesive 106 into the polarizer 104 may be reduced, thereby affecting the display effect of the electronic device 10.

Figure 2:
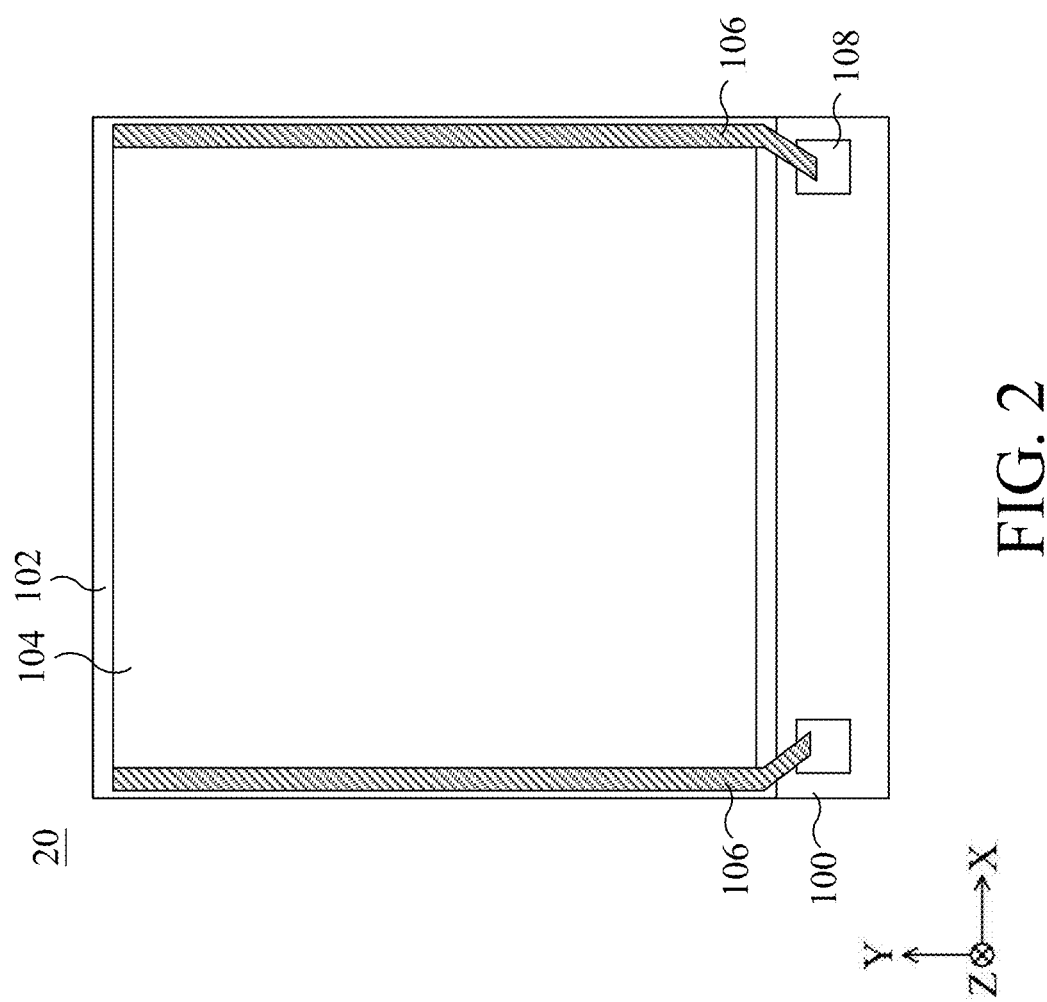
FIG. 2 is a top view of an electronic device according to other embodiments of the present disclosure.

Referring to FIG. 2. FIG. 2 is a top view of an electronic device 20 according to other embodiments of the present disclosure. The electronic device 20 of FIG. 2 is similar to the electronic device 10 of FIG. 1A, except that the conductive adhesive 106 of the electronic device 20 extends along a different direction than the conductive adhesive 106 in the electronic device 10. Specifically, as shown in FIG. 2, the conductive adhesive 106 may be adjacent to the edge of the polarizer 104 and extend longitudinally along the Y-axis. In an embodiment, a portion of the conductive adhesive 106 extending along the edge of the polarizer 104 may be in contact with the edge of the polarizer 104.

Furthermore, an angle between the extending direction of the conductive adhesive 106 in the electronic device 20 and the absorption-axis direction of the polarizer 104 may be between about 80 degrees and about 100 degrees, such as about 90 degrees. Likewise, the angle between the extension direction of the conductive adhesive 106 and the absorption-axis direction of the polarizer 104 in the above range may reduce the penetration of the conductive adhesive 106 into the polarizer 104, thereby affecting the visual effect of the peripheral area of the electronic device 20. Furthermore, the above design is also conducive to the development of the electronic device 20 toward extremely narrow borders.

In the embodiment shown in FIG. 2, the length of the interface where the conductive adhesive 106 is in contact with the polarizer 104 along the extending direction of the conductive adhesive 106 (e.g., the Y-axis in FIG. 2) may be greater than about 10% of the length of the polarizer 104 along the extension direction of the conductive adhesive 106, such as greater than about 20%, about 30%, about 40%, about 50%, about 60%, about 70%, about 80%, or about 90%. If the length of the interface where the conductive adhesive 106 is in contact with the polarizer 104 along the extending direction of the conductive adhesive 106 (e.g., the Y-axis in FIG. 2) is too short, such as less than about 10% of the length of the polarizer 104 along the extension direction of the conductive adhesive 106, the conductive adhesive 106 may not effectively conduct the static electricity accumulated on the surface of the electronic device 20. Furthermore, in some embodiments, the length of the interface where the conductive adhesive 106 is in contact with the conductive layer 1042 along the extending direction of the conductive adhesive 106 (e.g., the Y-axis in FIG. 2) may be equal to the length of the polarizer 104 along the extension direction of conductive adhesive 106.

As mentioned above, according to some embodiments of the present disclosure, the electronic device includes a polarizer and a conductive adhesive disposed on a first substrate. The conductive adhesive is adjacent to an edge of the polarizer, and an angle between an extension direction of the conductive adhesive and an absorption-axis direction of the polarizer is between 80° and 100°. As such, the possibility of the conductive adhesive being penetrated into the polarizer in a humid and warm environment may be reduced, which may otherwise negatively affect the visual effect of the peripheral area of the electronic device.

Although some embodiments of the present disclosure and their advantages have been disclosed above, it should be understood that a person of ordinary skill in the art may change, replace and/or modify the present disclosure without departing from the spirit and scope of the present disclosure. The features between the embodiments of the present disclosure may be arbitrarily combined as long as they do not violate or conflict with the spirit of the present disclosure. In addition, the scope of the present disclosure is not limited thereto the process, machine, manufacturing, material composition, device, method, and step in the specific embodiments described in the specification. A person of ordinary skill in the art will understand current and future process, machine, manufacturing, material composition, device, method, and step from the content disclosed in the present disclosure, as long as the current or future process, machine, manufacturing, material composition, device, method, and step performs substantially the same functions or obtain substantially the same results as the present disclosure. Therefore, the scope of the present disclosure includes the above-mentioned process, machine, manufacturing, material composition, device, method, and steps. The scope of the present disclosure should be determined by the scope of the claims. It is not necessary for any embodiment or claim of the present disclosure to achieve all of the objects, advantages, and/or features disclosed herein.

What is claimed is:

1. An electronic device, comprising:
    a first substrate;
    a polarizer disposed on the first substrate and having an edge;
    a conductive pad disposed on the first substrate; and
    a conductive adhesive disposed on the first substrate;
    wherein from a top view, the conductive adhesive has a first portion not overlapped with the conductive pad and a second portion overlapped with the conductive pad, and the first portion is disposed between the edge of the polarizer and the second portion;
    wherein from the top view, the first portion and the second portion form a bent shape, and an angle formed by the bent shape is greater than 0 degrees and less than 180 degrees;
    wherein an area of the conductive pad is greater than an area of the second portion.

2. The electronic device as claimed in claim 1, wherein the edge extends in a first direction.

3. The electronic device as claimed in claim 1, wherein the first portion does not overlapped with the polarizer.

4. The electronic device as claimed in claim 1, further comprising a second substrate disposed between the polarizer and the first substrate, wherein the second substrate and the polarizer are in contact with the first portion.

5. The electronic device as claimed in claim 1, wherein the conductive pad is in contact with and electrically connected to the second portion.

6. The electronic device as claimed in claim 1, wherein the conductive adhesive and the polarizer have a contact region, and a length of a portion of the contact region along a first direction is greater than 10% of a width of the polarizer along the first direction from the top view.

7. The electronic device as claimed in claim 1, wherein the polarizer comprises a polarizing film and a conductive layer, and a side well of the polarizing film is in contact with the conductive adhesive.

8. The electronic device as claimed in claim 7, wherein the conductive adhesive is electrically contacted with the conductive layer of the polarizer.

9. The electronic device as claimed in claim 8, wherein the conductive adhesive is in contact with both the conductive layer and the polarizing film of the polarizer.

* * * * *